United States Patent Office 3,002,949
Patented Oct. 3, 1961

3,002,949
COMPOSITION COMPRISING AN ORGANOPOLY-SILOXANE AND THE REACTION PRODUCT OF A TITANIUM ESTER AND FORMALDEHYDE, AND METHOD OF RENDERING FIBROUS MATERIAL WATER-REPELLENT THEREWITH
Siegfried Nitzsche and Ewald Pirson, Burghausen, Upper Bavaria, Germany, assignors to Wacker-Chemie G.m.b.H., Munich, Bavaria, Germany
No Drawing. Filed Oct. 17, 1958, Ser. No. 767,765
Claims priority, application Germany Nov. 13, 1957
14 Claims. (Cl. 260—42)

This invention relates to a composition suitable for rendering leather and textiles water repellent.

The use of organopolysiloxanes in water repellent treatments has been recognized for several years. Such varied materials as concrete, textiles, wood, leather and ceramic materials have been rendered water repellent with siloxanes. This invention is another in the line of compositions containing organosiloxanes which are suitable for use to render leather and textiles water repellent.

This invention is a mixture suitable for rendering leather, textiles and other fibrous materials water repellent comprising a mixture of (1) 50 to 98 percent by weight of an organopolysiloxane, and (2) 2 to 50 percent by weight of the reaction product of (a) a titanium ester and (b) formaldehyde or a material which readily splits off formaldehyde. Ingredients (1) and (2), defined above, can be dissolved in (3) an organic solvent.

The organopolysiloxanes employed in this invention are well-known materials prepared by standard processes. Operable siloxanes are disclosed in many United States patents including Nos. 2,588,366; 2,678,893; 2,774,690; 2,807,601; 2,588,365; and 2,727,736. The operable siloxanes have the average unit formula $$R_n SiO_{\frac{4-n}{2}}$$

where each R is a monovalent hydrocarbon radical and $n$ has a value of from 1.0 to 2.9. Each R can be an alkyl radical such as methyl, ethyl and octadecyl; an aryl radical such as phenyl and anthracyl; an alkaryl radical such as tolyl, xylyl and ethylphenyl; an aralkyl radical such as benzyl and phenylethyl; a cycloaliphatic radical such as cyclopropyl and cyclopentyl; or an alkenyl radical such as vinyl, allyl and octadecenyl. In a preferred embodiment, at least 50 percent of the R groups are methyl radicals. Mixtures and copolymers of siloxanes of units of the formulae $RSiO_{3/2}$, $R_2SiO$, $R_3SiO_{1/2}$ and $SiO_{4/2}$ are operable.

Particular embodiments which have been found to be particularly useful herein are: A mixture of (1) a siloxane of the unit formula $$R'_y SiO_{\frac{4-y}{2}}$$

where each R' is an alkyl radical or alkenyl radical of less than 4 carbon atoms and $y$ has an average value of 2.0 to 2.9, and (2) a copolymeric siloxane of $SiO_{4/2}$ units and $Me_3SiO_{1/2}$ units in such proportion that the average methyl to silicon ratio is from 1.0/1 to 2.4/1; a mixture of (1) a methyl siloxane polymer having a methyl to silicon ratio of from 2.0/1 to 2.9/1 and a viscosity at 25° C. of from 1,000 to 100,000 cs., and (2) a siloxane polymer of the unit formula $$Me_a H_b SiO_{\frac{4-a-b}{2}}$$

where $a$=1 to 1.5, $b$=.75 to 1.25, $a+b$=2.0 to 2.25; and optionally, (3) a methyl siloxane resin of the unit formula $$Me_x SiO_{\frac{4-x}{2}}$$

where $x$ has an average value of 1 to 1.25. Also operable are mixtures of (1) copolymers of $Me_3SiO_{1/2}$ units and $SiO_{4/2}$ units as described above and (2) dimethylsiloxanes; and mixtures of (1) a hydrogen substituted organosiloxane having .05 to 1 hydrogen atom attached directly to Si per silicon atom and a ratio of the total H and organic radicals to silicon atoms of 1.6/1 to 2.5/1, and (2) a hydroxylated siloxane of less than 1,000,000 cs. at 25° C. having an organic substituent to silicon ratio of 1.4/1 to 2/1. Also operative are methyl siloxanes such as dimethylsiloxane, copolymers of $Me_2SiO$ units and $MeSiO_{3/2}$ units, copolymers of $Me_3SiO_{1/2}$ units and $Me_2SiO$ units with or without $MeSiO_{3/2}$ units. Siloxane polymers, copolymers, and mixtures thereof containing methyl, ethyl, vinyl and phenyl substituents attached to silicon by C—Si bonds are the best known of the organosiloxanes and are operative herein.

The siloxanes employed herein vary from thin fluids to organic solvent soluble gum-like materials. They are commercially available and are well known in the art.

The titanium compounds employed in this invention are obtained by reacting titanium esters of alcohols having 3 to 10 carbon atoms and having the general formula $Ti(OZ)_4$ where each Z is a monovalent hydrocarbon radical of 3 to 10 carbon atoms, and partial hydrolyzates of such titanium esters with formaldehyde. Alternatively, a material which readily splits off formaldehyde, such as paraformaldehyde and trioxymethylene, can be employed thus producing the formaldehyde in situ and reacting it with the titanium ester. The reaction is generally carried forward at 85° to 115° C. when formaldehyde is employed per se. Particularly useful in this reaction is the combination of tetrabutyltitanate and formaldehyde.

The reaction of the titanium ester and formaldehyde can be carried out in vapor phase. The reaction can also be accomplished with formaldehyde or paraformaldehyde or trioxymethylene, in solution in an inert solvent. The reactants are employed in molar ratios of titanium ester/formaldehyde of between 1/1 and 1/7, inclusive. The preferred range of reactants is about 1 mol of titanium ester per 4 mols of formaldehyde.

After the titanium ester-formaldehyde reaction has gone to completion, the lighter fluid components are distilled off. This will include unreacted formaldehyde. The residue is employed as the additive.

The siloxane and titanium ester-formaldehyde reaction product can be merely admixed and employed as an undiluted mixture or the mixture can be dissolved in a suitable mutual organic solvent. Operable organic solvents include benzine, aromatic hydrocarbons such as benzene, toluene, and xylene as well as chlorohydrocarbons such as perchloroethylene. It is possible to employ the mixture of siloxane and titanium compound without dilution. Generally, an organic solvent solution of the water repellent composition containing 1% to 20% by weight of the siloxane-titanium compound mixture is employed.

The compositions of this invention are particularly suited for application to leather. These compositions impart excellent water repellency to all leather including chromium tanned, vegetable tanned and combination tanned leather. These compositions are particularly suited to use with vegetable tanned leathers which have heretofore resisted efforts toward rendering them water repellent.

These compositions greatly reduce the water absorption of leather. They render the leather water repellent and do not restrict the passage of air through the leather.

The following examples are included to aid in the understanding of this invention. These examples do not delineate the scope of the invention. All parts and per-

EXAMPLE 1

2040 parts of tetrabutyltitanate were heated to 90° C. in a round-bottom flask equipped with a stirrer and 720 parts of paraformaldehyde were added in small portions. Reaction was initiated within a few minutes after the addition of the paraformaldehyde and was completed after 45 minutes. The reaction flask was fitted with a distillation tower and the reaction mass was heated until all materials (800 parts) boiling below 115° C. had been distilled over. The residue had a viscosity of 23 sec. at 25° C., when measured in a No. 4 Ford cup.

A methyl siloxane resin of the average unit formula $Me_{1.8}SiO_{1.1}$ was mixed in varying proportions with the titanium compound prepared above. The mixtures contained 10%, 15% and 20% of the titanium compound and 90%, 85% and 80% respectively of siloxane. The mixtures were dissolved in trichloroethylene to give 10% solids in solution. Control solutions were also prepared employing equivalent weights of tetrabutyltitanate in place of the Ti-formaldehyde compound.

Chrome tanned leather and vegetable tanned leather pieces were impregnated by dipping in these solutions. The leather was stored for two days to assure curing of the water repellent agent. Upon testing, it was found that the leather treated with the compositions of this invention had significantly lower water absorption as compared to the leather treated with the composition containing the butyltitanate.

EXAMPLE 2

Solution A was prepared by dissolving 1 part of the tetrabutyltitanate-paraformaldehyde reaction product of Example 1, 5.5 parts dimethylpolysiloxane and 1.5 parts phenylmethylsiloxane resin in 92 parts perchloroethylene. Solution B was identical to A except 1 part tetrabutyltitanate was substituted for the titanate-formaldehyde reaction product. Test pieces of vegetable tanned upper leather and of vegetable tanned split leather were dipped in these solutions for two minutes. The solvent was removed by air-drying. After 7 days' storage the treated leather was tested for dynamic water penetration whereby the penetration of water through the leather during continual flexing of the leather is determined. The results are given below.

Table I

| Solution | Upper leather, flexes | Split leather, flexes |
|---|---|---|
| A | 9,800 | 2,236 |
| B | 2,960 | 850 |

It is apparent that the solution A, within the scope of this invention, imparts superior water penetration resistance by a factor of about 3 according to the dynamic water penetration tests.

EXAMPLE 3

Example 2 was repeated employing the reaction product of tetraoctyltitanate and formaldehyde in place of the tetrabutyltitanate-paraformaldehyde reaction product in solution A and tetraoctyltitanate per se in solution B. The dynamic water penetration tests showed solution A to be decidedly superior as a water repellent for leather, as compared to solution B.

EXAMPLE 4

Results equivalent to those achieved in the Example 1 were realized when the method set forth in Example 1 was followed with mixtures containing (A) 85 percent of a siloxane composition selected from (1) a mixture of a methylsiloxane having about 2.01 methyl groups per silicon atom and a copolymer of $SiO_{4/2}$ units and $Me_3SiO_{1/2}$ units having an average Me/Si ratio of about 1.4/1; (2) a mixture of a dimethylsiloxane polymer having a viscosity of about 50,000 cs. at 25° C. and a methylhydrogensiloxane polymer having a Me/Si ratio of about 1.25/1 and a H/Si ratio of about .75/1, (3) a mixture as set forth in (2) but with a siloxane resin of the average unit formula $Me_{1.2}SiO_{1.4}$ added thereto, (4) a mixture of a methylhydrogensiloxane having about .05 hydrogen substituents per silicon atom and about 2.0 methyl substituents per silicon atom and a hydroxylated methylsiloxane of 500,000 cs. at 25° C. having about 1.8 methyl radicals per silicon atom, and (B) the reaction product prepared as in Example 1 of (1) a polymeric butyl titanate prepared by hydrolyzing one mol of tetrabutyltitanate with about 1.8 mols of water and condensing the hydrolyzate to form a polymeric material and (2) formaldehyde.

EXAMPLE 5

Equivalent results were achieved when the following siloxanes were substituted for the siloxane resin in the method of Example 1:

$Me_3SiO[Me_2SiO]_xSiMe_3$ where $x=10,000$.

Copolymer of 90 mol percent $Me_2SiO$, 9 mol percent MePhSiO and 1 mol percent MeViSiO units.

Copolymer of 40 mol percent $Me_2SiO$, 40 mol percent $MeSiO_{3/2}$, 10 mol percent $Ph_2SiO$, 5 mol percent $PhSiO_{3/2}$ and 5 mol percent MePhSiO units.

Mixture of 50 percent methylsiloxane resin having a Me/Si ratio of 1.6/1 and 50 percent ethylsiloxane resin having an Et/Si ratio of 1.4/1.

That which is claimed is:

1. A composition of matter particularly suited for rendering fibrous materials water repellent consisting essentially of a mixture of (1) 50 to 98 percent by weight of an organopolysiloxane of the average unit formula $$R_nSiO_{\frac{4-n}{2}}$$

where each R is a monovalent hydrocarbon radical and $n$ has an average value of from 1.0 to 2.9 inclusive and (2) 2 to 50 percent by weight of the reaction product of (a) a titanium ester of an alcohol having 3 to 10 inclusive carbon atoms and (b) formaldehyde.

2. A composition in accordance with claim 1 wherein the organopolysiloxane (1) is a mixture of (a) a siloxane of the unit formula $$R'_ySiO_{\frac{4-y}{2}}$$

where each R' is an organic radical of less than 4 carbon atoms selected from the group consisting of alkyl radicals and alkenyl radicals and $y$ has an average value of 2.0 to 2.9, and (b) a copolymeric siloxane of $SiO_{4/2}$ units and $(CH_3)_3SiO_{1/2}$ units in proportions such that the average methyl to silicon ratio is in the range of 1.0/1 to 2.4/1.

3. A composition in accordance with claim 1 wherein the organopolysiloxane is a copolymer of $SiO_{4/2}$ units and $(CH_3)_3SiO_{1/2}$ units in proportions such that the average methyl to silicon ratio is in the range 1.0/1 to 2.4/1.

4. A composition in accordance with claim 1 wherein the organopolysiloxane is a mixture of a methyl siloxane polymer having a methyl to silicon ratio of from 2.0/1 to 2.9/1 and a viscosity at 25° C. of from 1000 to 100,000 cs., and a siloxane polymer of the unit formula $$(CH_3)_aH_bSiO_{\frac{4-a-b}{2}}$$

where $a=1.0$ to 1.5, $b=.75$ to 1.25, $a+b=2.0$ to 2.25.

5. The composition of claim 4 further characterized in that the organopolysiloxane mixture contains a methyl siloxane resin of the unit formula $$(CH_3)_x SiO_{\frac{4-x}{2}}$$

where $x$ has an average value of 1.0 to 1.25.

6. A composition in accordance with claim 2 wherein each R' represents a methyl radical and $y$ has an average value of about 2.0.

7. A composition in accordance with claim 1 wherein the organopolysiloxane (1) is a mixture of (a) a hydrogen substituted organosiloxane having an average of .05 to 1 hydrogen atoms attached directly to Si per silicon atom, wherein the organic substituents are monovalent hydrocarbon radicals, the ratio of total hydrogen atoms and organic radicals to silicon atoms being from 1.6/1 to 2.5/1 and (b) a hydroxylated siloxane resin of less than 1,000,000 cs. at 25° C., having an organic substituent to silicon ratio of 1.4/1 to 2/1.

8. A composition in accordance with claim 2 wherein the titanium compound is prepared by reacting a titanium ester with a molar excess of formaldehyde at a temperature of 85° to 115° C.

9. A composition in accordance with claim 3 wherein the titanium compound is prepared by reacting a titanium ester with a molar excess of formaldehyde at a temperature of 85° to 115° C.

10. A composition in accordance with claim 4 wherein the titanium compound is prepared by reacting a titanium ester with a molar excess of formaldehyde at a temperature of 85° to 115° C.

11. A composition in accordance with claim 7 wherein the titanium compound is prepared by reacting a titanium ester with a molar excess of formaldehyde at a temperature of 85° to 115° C.

12. In a method of imparting water-repellency to an air-permeable fibrous material, the step comprising impregnating said fibrous material with a mixture of 50 to 98 percent by weight of an organopolysiloxane of the average unit formula $$R_n SiO_{\frac{4-n}{2}}$$

where each R is a monovalent hydrocarbon radical and $n$ has an average value of from 1.0 to 2.9 inclusive and 2 to 50 percent by weight of the reaction product of a titanium ester of an alcohol having 3 to 10 inclusive carbon atoms and formaldehyde.

13. A composition of matter particularly suited for rendering fibrous materials water repellent consisting essentially of a mixture of (1) 50 to 98 percent by weight of an organopolysiloxane of the average unit formula $$R_n SiO_{\frac{4-n}{2}}$$

where each R is a monovalent hydrocarbon radical and $n$ has an average value of 1.0 to 2.9 inclusive and (2) 2 to 50 percent by weight of the reaction product of (a) a titanium ester of an aliphatic alcohol having 3 to 10 inclusive carbon atoms and (b) formaldehyde.

14. The composition of claim 13 further characterized in that (2) is a reaction product of tetrabutyl titanate and formaldehyde.

References Cited in the file of this patent

UNITED STATES PATENTS

| | | |
|---|---|---|
| 2,672,455 | Currie | Mar. 16, 1954 |
| 2,708,205 | Haslam | May 10, 1955 |
| 2,721,855 | Kin | Oct. 25, 1955 |

OTHER REFERENCES

Kraitzer et al.: "Esters of Titanium," Journal Oil & Colour Chemist's Ass'n., volume 31, No. 340, 1948, pages 405–414, page 414 relied upon.